US009467580B2

(12) United States Patent
Saluja

(10) Patent No.: US 9,467,580 B2
(45) Date of Patent: Oct. 11, 2016

(54) MULTIPLE JOB SUBMISSION FROM LOCAL USER INTERFACE

(75) Inventor: Veena Kumari Saluja, Welwyn Garden (GB)

(73) Assignee: XEROX CORPORATION, Norwalk, CT (US)

( * ) Notice: Subject to any disclaimer, the term of this patent is extended or adjusted under 35 U.S.C. 154(b) by 2298 days.

(21) Appl. No.: 11/837,022

(22) Filed: Aug. 10, 2007

(65) Prior Publication Data

US 2009/0044130 A1 Feb. 12, 2009

(51) Int. Cl.
*G06F 17/00* (2006.01)
*H04N 1/00* (2006.01)
*G06F 17/24* (2006.01)

(52) U.S. Cl.
CPC ........ *H04N 1/00204* (2013.01); *G06F 17/243* (2013.01); *H04N 1/00244* (2013.01); *H04N 1/00413* (2013.01); *H04N 1/00474* (2013.01); *H04N 1/00477* (2013.01); *H04N 1/00493* (2013.01); *H04N 2201/0094* (2013.01)

(58) Field of Classification Search
CPC .............. G06F 17/221; G06F 17/243; G06F 17/30011
USPC ................................ 715/200, 273, 274, 277
See application file for complete search history.

(56) References Cited

U.S. PATENT DOCUMENTS

| | | | | |
|---|---|---|---|---|
| 4,273,439 | A * | 6/1981 | Markham et al. | 399/87 |
| 4,297,025 | A * | 10/1981 | Bach et al. | 399/87 |
| 5,894,586 | A * | 4/1999 | Marks et al. | 710/28 |
| 6,069,706 | A * | 5/2000 | Kajita et al. | 358/1.15 |
| 6,590,673 | B2 * | 7/2003 | Kadowaki | 358/1.15 |
| 6,757,071 | B1 | 6/2004 | Goodman et al. | |
| 7,136,182 | B2 * | 11/2006 | Kajita et al. | 358/1.15 |
| 7,158,123 | B2 | 1/2007 | Myers et al. | |
| 7,187,795 | B2 * | 3/2007 | Jones et al. | 382/135 |
| 7,200,255 | B2 * | 4/2007 | Jones et al. | 382/135 |
| 7,366,436 | B2 * | 4/2008 | Akiyama et al. | 399/81 |
| 7,587,067 | B1 * | 9/2009 | Schiller | 382/116 |
| 7,599,543 | B2 * | 10/2009 | Jones et al. | 382/137 |
| 7,602,956 | B2 * | 10/2009 | Jones et al. | 382/135 |
| 7,620,231 | B2 * | 11/2009 | Jones et al. | 382/137 |
| 7,647,275 | B2 * | 1/2010 | Jones | 705/40 |
| 7,746,495 | B2 * | 6/2010 | Kajita et al. | 358/1.15 |
| 7,783,221 | B2 * | 8/2010 | Akiyama et al. | 399/81 |
| 7,881,519 | B2 * | 2/2011 | Jones et al. | 382/135 |
| 7,882,000 | B2 * | 2/2011 | Jones | 705/35 |
| 2002/0133239 | A1 * | 9/2002 | Rebellius et al. | 700/1 |

(Continued)

OTHER PUBLICATIONS

U.S. Appl. No. 11/522,171, filed Sep. 15, 2006, Sampath, et al.

*Primary Examiner* — Stephen Hong
*Assistant Examiner* — Gregory J Vaughn
(74) *Attorney, Agent, or Firm* — Fay Sharpe LLP

(57) ABSTRACT

A multifunction device (MFD) includes a control system and a plurality of associated local user interfaces including a first local user interface in communication with the control system for user selection of a selected one of a first group of mutually exclusive operations under the control of the control system and a second local user interface in communication with the control system for user selection of a selected one of a second group of mutually exclusive operations, different from the first group of operations, which are under the control of the control system. The device optionally includes a third local interface in communication with the control system, which serves as an interface between the first and second local user interfaces and the control system.

30 Claims, 4 Drawing Sheets

(56) References Cited

U.S. PATENT DOCUMENTS

| | | |
|---|---|---|
| 2003/0007170 A1* | 1/2003 | Kajita et al. ............... 358/1.15 |
| 2003/0009420 A1* | 1/2003 | Jones ............................ 705/39 |
| 2003/0059098 A1* | 3/2003 | Jones et al. .................. 382/135 |
| 2003/0123112 A1* | 7/2003 | Kajita et al. ................. 358/538 |
| 2003/0132281 A1* | 7/2003 | Jones et al. .................. 235/379 |
| 2004/0041848 A1 | 3/2004 | Wegeng et al. |
| 2005/0265591 A1* | 12/2005 | Jones et al. .................. 382/135 |
| 2005/0278239 A1* | 12/2005 | Jones et al. ................... 705/35 |
| 2006/0006298 A1* | 1/2006 | Akiyama et al. ......... 248/292.12 |
| 2006/0010071 A1* | 1/2006 | Jones et al. .................... 705/42 |
| 2006/0290962 A1 | 12/2006 | Lynn et al. |
| 2007/0067269 A1 | 3/2007 | Rudge et al. |
| 2007/0097425 A1* | 5/2007 | Kajita et al. ................ 358/1.15 |
| 2007/0112674 A1* | 5/2007 | Jones ............................ 705/45 |
| 2007/0147869 A1* | 6/2007 | Akiyama et al. ............... 399/81 |
| 2009/0310188 A1* | 12/2009 | Jones et al. .................. 358/448 |
| 2009/0313159 A1* | 12/2009 | Jones et al. ................... 705/35 |
| 2010/0034454 A1* | 2/2010 | Jones et al. .................. 382/137 |
| 2011/0087599 A1* | 4/2011 | Jones ............................ 705/45 |

* cited by examiner

MULTIPLE JOB SUBMISSION FROM LOCAL USER INTERFACE

CROSS REFERENCE TO RELATED PATENTS AND APPLICATIONS

The following reference, the disclosure of which is incorporated in its entirety herein by reference, is mentioned:

Application Ser. No. 11/522,171, filed Sep. 15, 2006, entitled FAULT MANAGEMENT FOR A PRINTING SYSTEM, by Meera Sampath, et al.

BACKGROUND

The exemplary embodiment relates to multifunction devices. It finds particular application in connection with a multifunction device having a plurality of local user interfaces which permit multiple local users to make their selections of operations of the multifunction device at the same time.

Multifunction devices (MFDs), such as those with printing, copying, and faxing functions, provide a user with the ability to perform a variety of image rendering operations on a single device. Typically, a local user interface (LUI) displays the user selectable operations on a touch screen that allows users to select from the various options by touching appropriate locations on the screen. The LUI screens are designed to provide access to one function at a time. Currently, MFD's allow only a single walk up user to submit jobs. For example, if one user is scheduling a copy job on the MFD, another user cannot print documents from a mailbox. The MFD thus is restricted to a single user from the LUI at any one time.

It would be desirable for multiple users to have simultaneous access to the multifunction device.

INCORPORATION BY REFERENCE

U.S. Pub. No. 2004/0041848, published Mar. 4, 2004, entitled MARKING MACHINE USER INTERFACE ENHANCEMENT VIA PORTABLE ELECTRONIC DEVICE, by Wegeng, et al., the disclosure of which is incorporated in its entirety herein by reference, discloses a user interface extension that allows data entry into a field of a marking machine user interface from an electronic device via compatible communications ports.

BRIEF DESCRIPTION

In accordance with one aspect of the exemplary embodiment, a multifunction device is provided. The device includes a control system and a plurality of local user interfaces, including a first local user interface in communication with the control system for user selection of a selected one of a first group of mutually exclusive operations under the control of the control system, a second local user interface in communication with the control system for user selection of a selected one of a second group of mutually exclusive operations, different from the first group of operations, which are under the control of the control system, and optionally, a third local interface in communication with the control system, which serves as an interface between the first and second local user interfaces and the control system.

In accordance with another aspect of the exemplary embodiment, a method of operating a multifunction device includes displaying representations of a first group of mutually exclusive operations on a first local user interface associated with the multifunction device and displaying representations of a second group of mutually exclusive operations on a second local user interface associated with the multifunction device. The method further includes providing for receiving of a first user's selection of one of the first group of mutually exclusive operations with the first local user interface and providing for receiving a second user's selection of one of the second group of mutually exclusive operations with the second local user interface, contemporaneously with the receiving of the first user's selection and communicating the first user's selection and second user's selection to a control system of the multifunction device.

In accordance with another aspect, a computer program product encodes instructions which, when executed on a computer, perform the method of operating a multifunction device.

In accordance with another aspect of the exemplary embodiment, a multifunction device includes a first operational component operative to perform a first function, a second operational component operative to perform a second function, a first local user interface operative for local selection by a first user of a first operation of the multifunction device which requires the first function, and a second local user interface operative for local selection by a second user of a second operation of the multifunction device which requires the second function.

In accordance with another aspect of the exemplary embodiment, a user interface network includes a control system and a plurality of local user interfaces including a first local user interface in communication with the control system which displays a first group of operations under the control of the control system, the first local user interface enabling selection by a first user of a first operation selected from the first group of operations, each of the operations in the first group operations including marking, a second local user interface in communication with the control system which displays a second group of operations under the control of the control system, the second local user interface enabling selection by a second user of a second operation selected from the second group of operations, each of the operations in the second group of operations including scanning, and optionally a third local interface in communication with the control system, which displays a third group of operations under the control of the control system, each of the operations in the third group of operations being capable of contemporaneous performance with the first and second operations.

DETAILED DESCRIPTION

Figure 1:
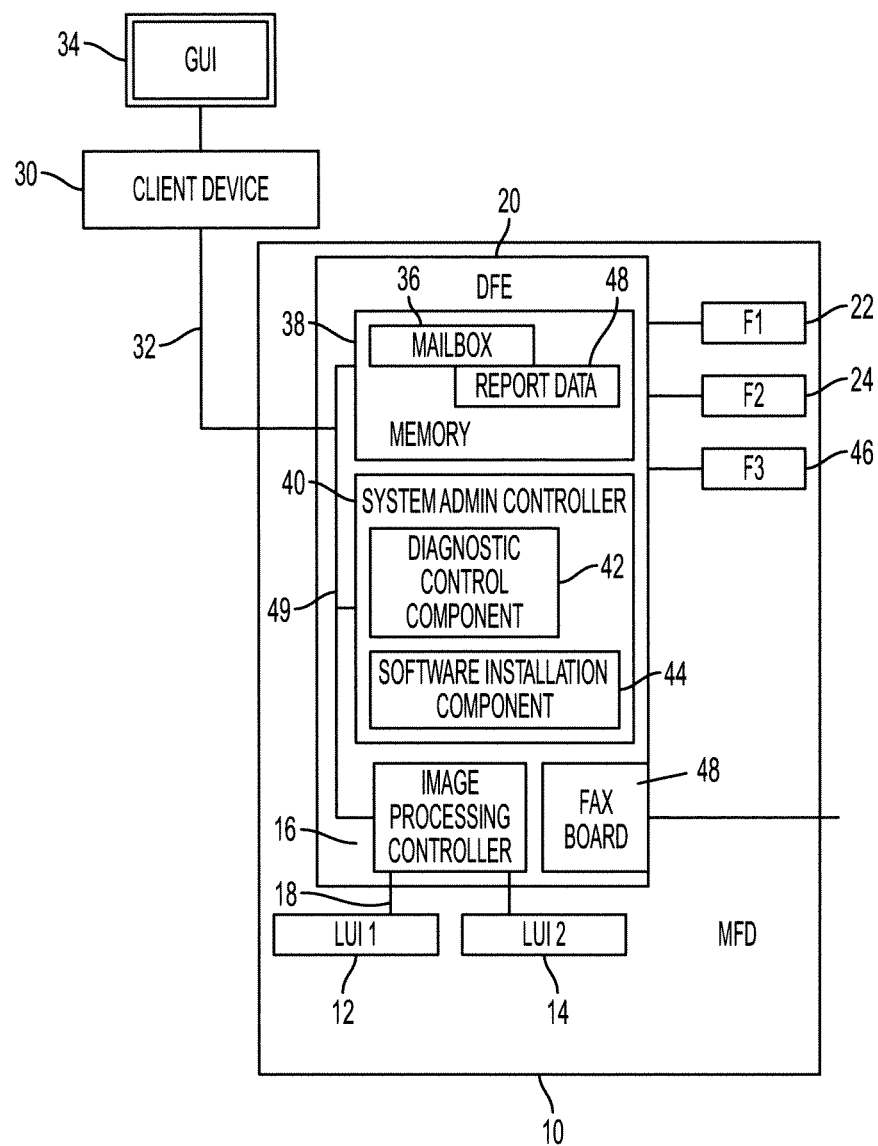
FIG. 1 is a functional block diagram of an environment in which a multifunctional device in accordance with the exemplary embodiment operates.

Aspects of the exemplary embodiment relate to a multifunction device (MFD) which includes operational components which, among them, provide a plurality of functions, allowing a user to select from a plurality of available operations which incorporate the various functions. The MFD may be an image rendering device in which the operations may include two or more of printing, copying, faxing, scanning, scan to email, and the like. Each of the operations may be user-selectable via an appropriate one of a plurality of local user interfaces (LUI's) located proximate the MFD, which allows contemporaneous user interaction with the MFD by respective users.

While the exemplary embodiment is described in terms of an image rendering device with both marking and scanning functions, it is to be appreciated that other multifunction devices are also contemplated.

As used herein, a "user" can be an operator of the device, such as a person selecting an operation which employs printing or scanning functions, or another user, such as an administrator performing administrative functions, such as printing reports of documents printed, faxed, etc. and/or diagnostic reports, or a service engineer, using an LUI, for example, to control the performance of diagnostic checks.

The provision of two (or more) LUI's in association with a single MFD allows a plurality of users to select different operations of the MFD, wherein the act of selection and/or the performance of at least a part of the operations may occur contemporaneously. Operations of the MFD may be clustered in the LUI's according to the processing components of the MFD which the operations utilize. For example, a first group of mutually exclusive operations utilizing a first operational component are clustered together for selection at a first LUI and a second group of mutually exclusive operations utilizing a second operational component are clustered together for selection at a second LUI.

By "mutually exclusive," it is meant that the two operations require dedicated use of the same operational component and thus cannot be performed at the same time. By clustering a group of mutually exclusive operations on only a single LUI, users are prevented from trying to control operations requiring the same operational component of the MFD at the same time from two (or more) LUIs.

In various aspects, a first user may select one operation on the first LUI from a set of first operations, each of which utilizes the first operational component but which does not require use of a second operational component. A second user may select a different operation on the second LUI, from a set of second operations, each of which requires the second operational component. The selecting of the first and second operations on the two LUI's may take place contemporaneously. Additionally or alternatively, the performing of the first and second operations may take place contemporaneously. For example, both users may be inputting their selections contemporaneously. In one embodiment, the second operation is one which either does not require use of the first operational component or which employs the first operational component after use of the second operational component, whereby the MFD can contemporaneously perform the functions of the first and second operational components for the first and second operations, respectively.

In a specific example, mutually exclusive operations which do not require scanning, such as printing a document stored in memory and printing reports, are clustered on a first LUI and mutually exclusive operations requiring scanning, such as scanning to file, copying, scanning to fax, and scanning to email, are clustered on a second LUI.

FIG. 1 illustrates a functional block diagram of an exemplary environment in which a multifunction device 10 in accordance with the exemplary embodiment operates. Operations of the MFD 10 are selectable via a user interface network which includes at least first and second local user interfaces 12, 14 (illustrated as LUI 1 and LUI 2). The LUI's are local to the MFD, from whence the operations of the MFD can generally be monitored visually by the user. While two LUIs 12, 14 are shown in FIG. 1, it is to be appreciated that there may be more than two LUIs, such as three, four, or more LUIs. Both LUIs communicate with a common image processing controller 16 via a wired or wireless link(s) 18. The controller 16 may be hosted by the MFD's control system 20, often referred to as a digital front end (DFE).

The MFD 10 includes operational components 22, 24, etc. (illustrated schematically as F1 and F2). The operational components are generally associated with image processing, such as a marking engine 22 and a scanner 24. Each of the operational components 22, 24, etc is able to perform a function utilized in one or more operations of the MFD (either alone or in combination with other operational components). Exemplary operations include image processing operations, such as scanning, copying, faxing, and printing. Image processing operations generally involve the processing of jobs, such as print jobs, copy jobs, or fax jobs.

Print jobs and copy jobs generally include one or a plurality of digital "pages" to be rendered in hardcopy as one or more copies on a set of associated sheets of print media, each page, when rendered, constituting the front or back side of a sheet. Each digital page may comprise one or more images, such as graphics, text, or photographs, to be processed. The sheets of a print or copy job may arrive from a common paper source and, when images have been rendered thereon, be assembled at a common output destination, such as a finisher. Some of the print jobs controlled via the LUI 22 are stored in the MFD and may include instructions for printing, such as number of copies, print media to be used, and the like, e.g., in the form of a job ticket. Other print jobs may include reports stored in memory or generated from data stored in memory, such as reports of the machine configuration (what operational components are present, and so forth) and reports of faxes which have been sent and when. Yet further print jobs may be released to the MFD from an external source, e.g., upon entering a specific code via the LUI 22.

For example, operational component F1 may be a marking engine (or "printer") 22, which performs a marking function and which may be used in performing operations such as document printing and printing of reports. In particular, the marking engine 22 renders a stored digital image on print media, such as paper, transparency, cardstock, or the like, using one or more colorants, such as inks or toners. Operational component F2 may be a scanner 24, which performs a scanning function and which may be used in performing operations such as scanning, copying and faxing. In particular, the scanner 24 acquires a digital image of an original hardcopy document, which image may be stored and optionally further processed by other operational components of the MFD. A copying operation may be performed by a combination of scanning and printing operations.

As will be appreciated, other operational components of the MFD, which are not illustrated in FIG. 1 for convenience, may include a print media source, such as a high speed paper feeder, a finisher which receives printed sheets from the printer, and a print media conveyor system, which conveys the paper from the paper source to the marking engine and finisher in turn.

Print jobs may be generated on a client device 30, such as a desktop computer, laptop, PDA, mobile phone or the like. Client device 30 and MFD 10 are shown as being coupled to one another through a computer network 32, such as a wired or wireless LAN. They may, however, be directly coupled to each other. For example, the MFD 10 may be coupled to the client device 30 through a parallel port or USB port of client device 30. The client device hosts an MFD driver program, installed on client device 30. The MFD driver program may be activated through an application interface so that a user may generate a print job with the MFD driver for processing by the MFD 10. The MFD driver includes a print job processor for generating print jobs and submitting them to the MFD 10 from the client device 30. The MFD driver also includes a user interface, such as a graphical user interface (GUI) 34 for communicating, to a user, MFD features for print job, and accepting the user's selection of available MFD features. Print jobs generated by the client device may be received by the MFD and printed automatically by the MFD or may be stored in a mailbox 36 in data storage memory 38 associated with the MFD control system 20. Print jobs stored in memory 38 can be selected for printing by a walk up user at the MFD using an appropriate one of the LUIs 12, 14, such as LUI 12.

The print jobs selected by the user for printing may placed in a job queue by the image processing controller 16 to be processed, in conventional fashion, by raster image processing (RIP) and print spooling capabilities of the DFE 20. Image data from the DFE is sent to a selected marking engine or engines 22 for printing according to a schedule determined by the image processing controller 16. The marking engines can be xerographic marking engines, ink jet marking engines, or the like.

The exemplary MFD control system 20 also includes a system administration controller 40 which controls various administrative functions of the MFD. In the illustrated embodiment, the system administration controller 40 includes a diagnostic control component 42 and a software installation component 44. The diagnostic control component 42 controls the performance of diagnostic checks on the MFD and generates reports based on the results of these checks. The software installation component 44 performs software installation and updates existing software. For example, when a new operation component is added or modified, software for operating the operational component may be added or modified by the software installation component 44.

The MFD 10 may also include one or more administrative components (F3) identified by numeral 46. The administrative components 46 may be under the control of/in communication with the system administration controller 40. For example, administrative component 46 (designated F3) may be a diagnostic acquisition component which acquires diagnostic data. Examples of diagnostic acquisition components 46 include sensors, such as real virtual sensors. Diagnostic operations performed under the control of the diagnostic control component 42 by the sensors may involve performing checks on the health of the MFD, such as checks on voltages, currents, temperatures, speeds, etc. of operating components, checks on paper registration, color rendering, and the like. For example, diagnostic acquisition components may obtain information on fuser roll temperature, nip roller speeds, electrical properties, sheet properties, toner coverage, toner concentration, image quality characteristics, such as gloss, image registration, color rendering, and substrate characteristics, such as paper arrival time, paper curl, paper damage, humidity and temperature of the environment, decision gate sensors, motor torque sensors, media type sensors, and media property sensors that measure moisture content and resistivity of print media. Virtual sensors may include fault counters, error counters, watchdog timers, and actuators outputs from closed loop control systems within the marking engine. Other system administration components are described for example, in above-mentioned application Ser. No. 11/522,171 incorporated herein by reference.

The various diagnostic acquisition components 46 communicate with the diagnostic control component 42 of the system administration controller. Information obtained from the diagnostic acquisition components may be stored and/or processed by the diagnostic control component and thereafter used to generate reports, such as diagnostic reports. These reports may be stored in an appropriate location 47 in memory 38.

One of the LUIs, such as LUI 1, LUI 2, or an additional LUI, as discussed below with respect to FIG. 3, may be used for user interaction with the system administration controller 40.

As shown in FIG. 1, the control system 20 may further include a fax board 48, in communication with a telephone network, for transmitting fax jobs, e.g., fax jobs scanned by scanner 24.

The illustrated control system 20 thus includes processing components 16, 40, 48 for scheduling print jobs, copy jobs, faxing documents, and other operations of the MFD and for detection and diagnosis of faults and responding to faults when detected. The various processing components may execute instructions stored in memory 38. It is to be appreciated that while the illustrated control system 20 is shown as having several processing components 16, 40, 48 (and subcomponents), it is contemplated that the functions of two or more of the processing components/subcomponents may be combined in a single chip or that functions of a single component may be distributed throughout the MFD 10, located on a server or otherwise be remote from the operational components of the MFD. The processing components 16, 40, 48 may reside in a single location, as shown, or may be distributed throughout the MFD. Indeed, some of the processing components may be resident in one or more of the operational components 22, 24. The processing components 16, 40, 48 and subcomponents may be embodied in software, hardware or both and communicate with each other via a data/control bus 49.

The memory 38 may represent any type of computer readable medium such as random access memory (RAM), read only memory (ROM), magnetic disk or tape, optical disk, flash memory, or holographic memory. In one embodiment, the memory 38 comprises a combination of random access memory and read only memory. In some embodiments, the processing components 16, 40 and memory 38 may be combined in a single chip.

Figure 2:
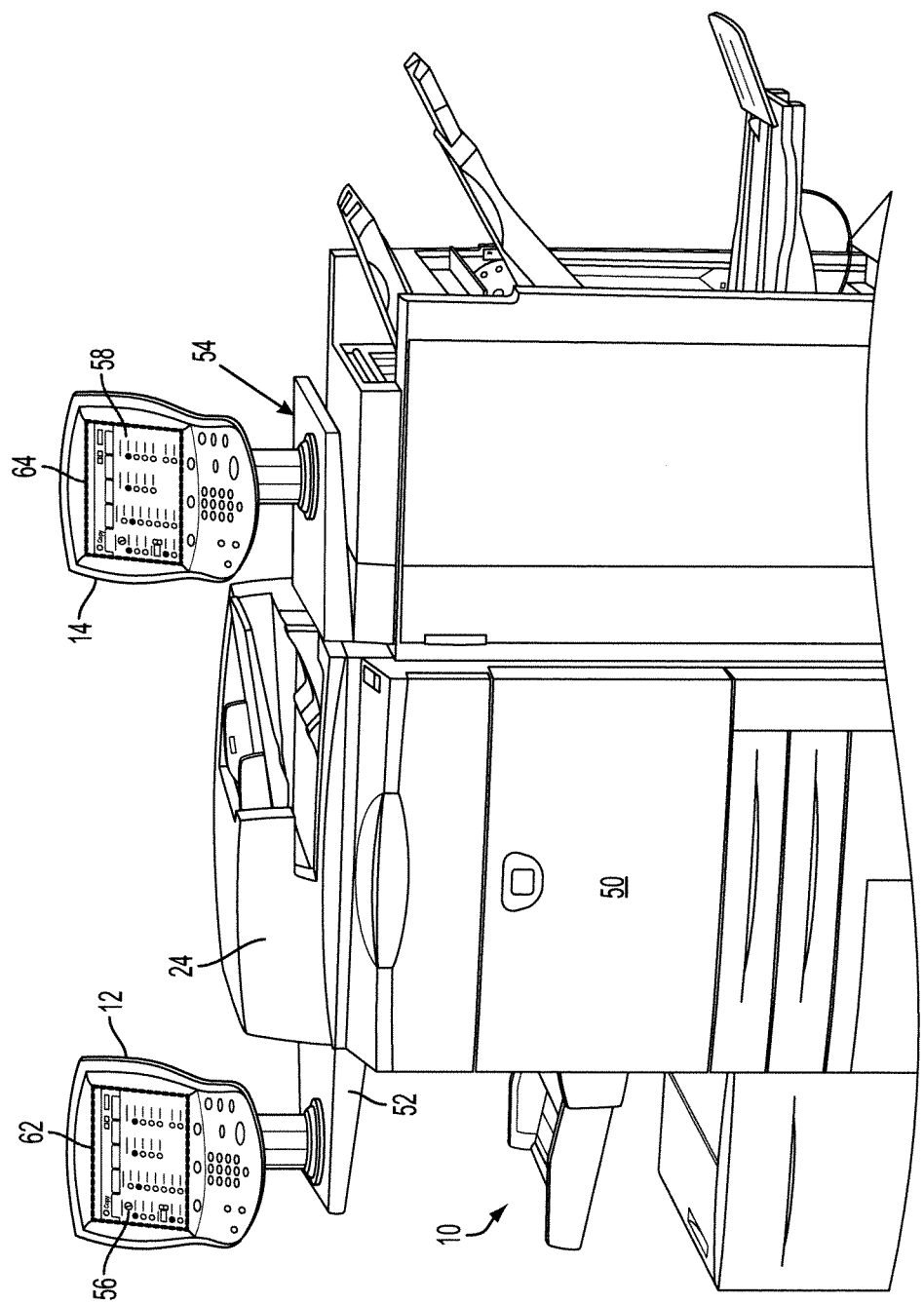
FIG. 2 is a perspective view of an exemplary multifunction device of the type shown schematically in FIG. 1.

An exemplary MFD is illustrated in FIG. 2. The operational components F1, F2, etc. and diagnostic components F3 are housed in a frame or housing 50, which also supports the LUI's 12, 14, etc. In the illustrated embodiment, the LUI's 12, 14 are mounted on brackets 52, 54 carried by the MFD housing 50 and are spaced sufficiently apart so that two users physically present at the MFD at the same time can operate the LUIs in parallel. It will be appreciated that the LUI's may be mounted directly on the housing or proximate thereto in any convenient location to be accessed by walk up users of the MFD. The LUIs may be manually operable for entering user selections. For example, the LUIs may each include a display 56, 58, such as a LCD display, and a user input device 60, 62, such as a touch screen, keyboard, or the like, by which a user inputs a selection.

As noted above, the operations of the MFD 10 are logically grouped so that operations from different groups can be performed simultaneously by different users. To allow different users to perform operations, the operations are available on different LUIs. The logical grouping may be based on the resources of the machine or type of operation being performed. An exemplary grouping based on a combination of both these considerations is illustrated in FIG. 3, where four LUI's 70, 72, 74, 76 are shown by way of example. Group a): As copy jobs, scan to fax, and scan to email jobs all employ the scanner for scanning, the MFD configuration allows only one of these operations to be selected at any given time. Accordingly, these mutually exclusive operations may be grouped together and hence may be controlled via the same LUI, in this case, a scanning operations LUI (scanLUI) 70.

Group b): Jobs which are to be submitted from the LUI for printing, such as printing print jobs from the mailbox and printing of reports, such as reports of faxes which have been sent or diagnostic reports, all require use of the marking engine and thus can be considered mutually exclusive. These jobs can be grouped together and placed on a different LUI, in this case, a printing operations LUI (MarkLUI) 72.

Group c): System administrative functions, such as installation of an option or machine diagnostics can be grouped together and placed on yet another LUI, in this case, a server LUI (ServerLUI) 74. The operations in this group are generally such that they do not have any effect on the operations in Group a) or Group b) or which override jobs in those groups, e.g., by shutting down the LUIs 70, 72.

The LUIs 70, 72, 74, 76 may be similarly configured to LUIs 1 and 2 of FIGS. 1 and 2, except as noted. It is to be appreciated that fewer than four LUI's may be employed.

Figure 3:
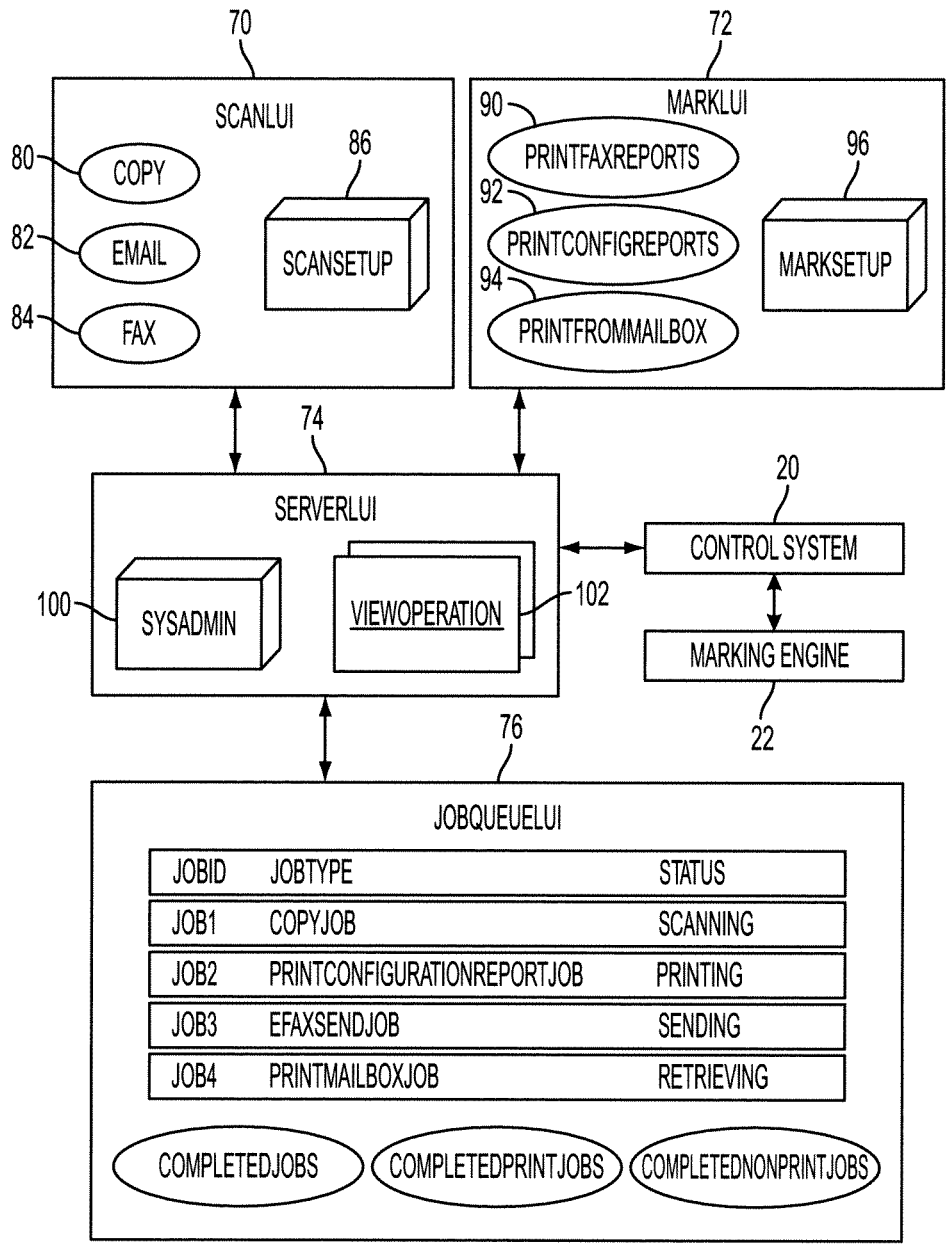
FIG. 3 is a functional block diagram of an embodiment of a multifunction device with four local user interfaces in accordance with another aspect of the exemplary embodiment.

The exemplary user interface network, illustrated in FIG. 3, which includes a system of multiple LUIs 70, 72, 74, 76, is based on resources of the exemplary MFD and its operations. As will be appreciated, there may be some flexibility in the assignment of operations to the various groups, depending on the configuration of the MFD. For example, if a read/write to a Non-Volatile Memory (NVM) has an effect on jobs submitted in Group a) or Group b), then it may be better placed in one of these groups, rather than in Group c).

The ScanLUI 70 may allow the user to control the following two types of operations:

Job Submission: The jobs which can be submitted on this LUI include Copy, Email, and Fax jobs. The ScanLUI allows users to submit jobs which are mutually exclusive as they all need the scanner.

Scan Setups: This operation allows a user, such as a System Administrator or Key Operator (SAKO), to set up defaults for a job.

The illustrated scanLUI 70 displays selectable representations of only those operations which may be selected via this LUI, here shown as copy, fax, and scan selection buttons 80, 82, 84. Touching or otherwise actuating one of these buttons 80, 82, 84 may open up an additional screen or screens, which allows additional features of the selected job to be selected, such as number of copies, paper type, etc. in the case of a copy job, or a default setting. A scan setup button 86 allows set up features of the scanner to be selected. The selection of the scan set up button 86 may take the user to another screen to select the specific job type (copy/fax/email) which needs to be setup.

The markLUI 72 may allow the user to control the following two types of operations:

Job Submission: The jobs which can be submitted may include printing fax reports, printing from a mailbox, and printing configuration reports. This LUI allows users to submit jobs which are mutually exclusive as they all need the marking engine to mark/print.

Marking Engine Setups: This operation allows a user, such as a SAKO, to set up defaults for a job.

The illustrated markLUI 72 displays selectable representations of only those operations which may be selected via this LUI, here shown as selection buttons 90, 92, 94. Touching or otherwise actuating one of these buttons 90, 92, 94 may open up an additional screen or screens, which allows additional features of the selected job to be selected. A mark setup button 96 allows set up features of the selected job type to be selected. The selection of the mark set up button 96 may take the user to another screen to select the specific job type which needs to be setup.

One of the LUIs (here LUI 74) may function as a server LUI. ServerLUI 74 provides a communication link between the other LUIs 70, 72, 76 (sub LUIs) and the controller 16. Specifically, user selections are relayed from LUIs 70, 72, 76 to serverLUI 74, which communicates them to the controller 16. The controller 16 may similarly communicate with the serverLUI 74 for transferring information to be displayed on one or more of the LUIs 70, 72, 74, 76. While the serverLUI 54 is shown as a separate LUI, it my alternatively be incorporated into one of the other LUIs.

In addition to acting as a server, the ServerLUI 74 may be configured for receiving user selections for one of the above-mentioned groups of operations. For example, it may have the following two types of operations:

View operations: This function allows a user, such as a Customer Service Engineer (CSE), to retrieve and read information such as NVM settings, machine settings, market region, speed of the machine, and the like, e.g., for machine diagnostics. In one embodiment, the View operations function does not allow access to operations requiring modification to these settings, since it could interfere with operations initiated through other LUIs 70, 72, 76. This operation allows concurrent operations to be performed on any of the sub LUIs 50, 52, 56.

System Administration: This function allows system administration functions, such as software upgrades, installation of options, and modification to NVMs/machine settings. System administration functions usually need the MFD to be offline. As a result, all the LUIs would need to be offline during these operations so that no jobs are submitted. If a user selects the System Administration function, the controller may prevent the submission of jobs from the other LUIs and/or provide for the other LUIs to display a warning that the MFD is offline for System Administration operations.

The ServerLUI 74 has view operations and system administration buttons 100, 102 which, allows these operations to be selected. The selection of one of these buttons 100, 102 may take the user to another screen to select the operation which needs to be viewed or set up.

The JobQueueLUI: this LUI 76 displays all the submitted incomplete jobs and their status. It also allows users to retrieve information about jobs which have been completed and their details. As will be appreciated, in other embodiments, this LUI may be omitted. One or more of the other LUIs may then incorporate the features of the JobQueueLUI.

In the exemplary system, a multi user and a multi tasking environment may be facilitated in the following different ways:

1. A first user can set up a job on ScanLUI 70 while another user submits a print job on MarkLUI 72, thereby achieving a multi user and multi tasking environment. For example setting transmission report to on for fax jobs should not have effect on Mark jobs being submitted on another LUI.
2. A copy/scan/fax job can be submitted from ScanLUI 70 while another job from MarkLUI 72 can be submitted.
3. The user can select operations to query from Job queue LUI while jobs are allowed to be submitted/set up from Scan and Mark LUIs.
4. View Operations can be performed by a user on ServerLUI 74 while jobs are allowed to be submitted/set up from Scan and Mark LUIs.

The exemplary system has a number of advantages: Multiple users can submit jobs without having to queue for a machine. It facilitates a multi tasking environment. Having multiple LUIs results in less machine down time to users for job submission as jobs can be submitted from one LUI while diagnostics can be done from other LUI. One benefit of multitasking and multi-user functionality is improved productivity.

Figure 4:
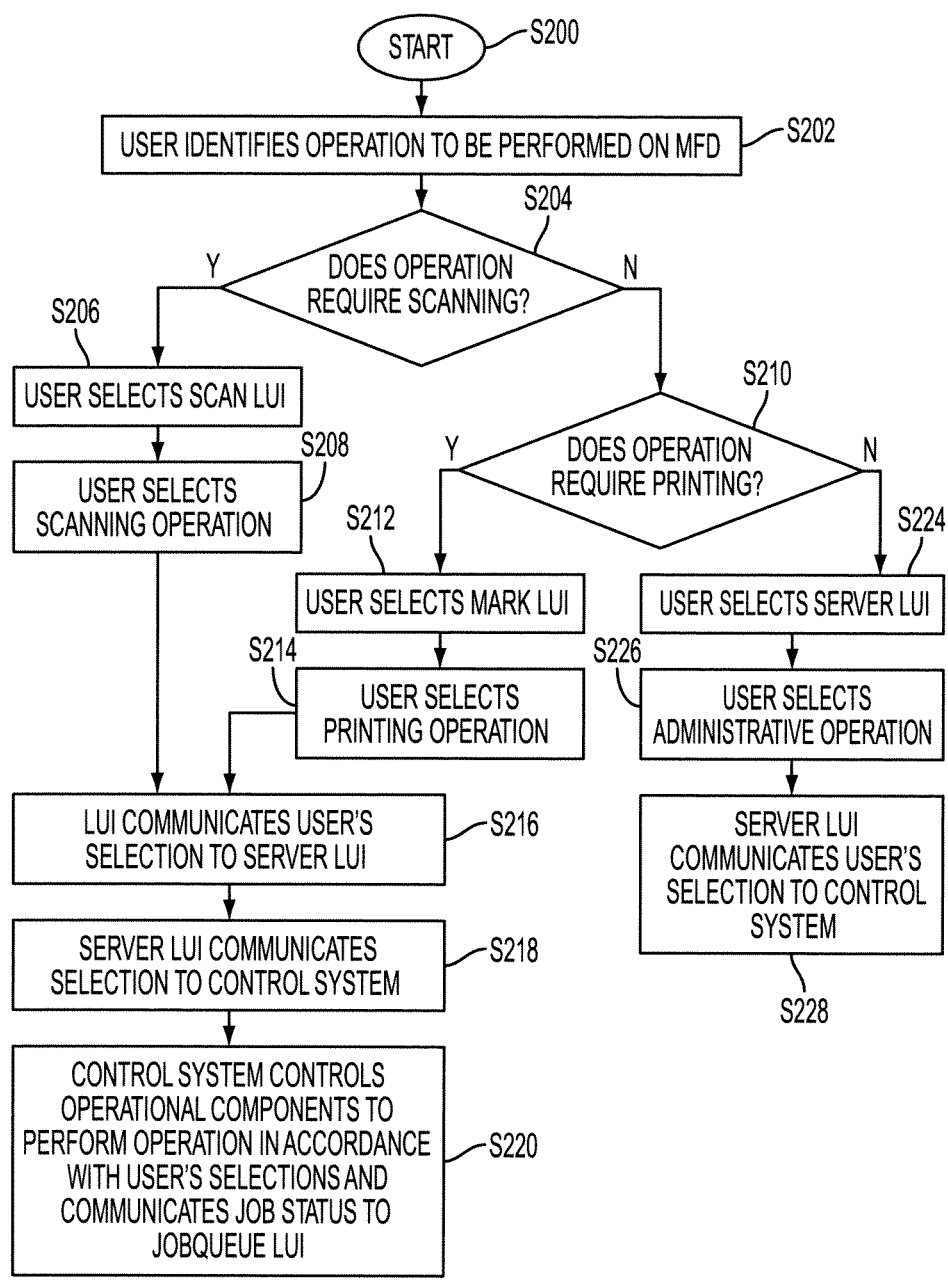
FIG. 4 illustrates an exemplary method for operating the multifunction device of FIGS. 1 and 3.

FIG. 4 illustrates an exemplary method of operating an MFD in accordance with the exemplary embodiment. The method begins at S200.

At S202, a user identifies an operation to be performed on the MFD.

At S204 the user determines if the job requires scanning. If so, at S206, the user selects the ScanLUI 70 and at S210 the ScanLUI receives the user's selection of features of the scanning operation. If at S204, the user determines that the operation does not require scanning, at S212, the user determines if the job requires printing. If so, at S214, the user selects the MarkLUI 72 and at S216, the MarkLUI receives the user's selection of features of a job which requires printing. At S218, the respective LUI 70 or 72 communicates the user's selections to the ServerLUI 74, which in turn, transmits these to the image processing controller 16 of control system 20 at S220. The controller processes the job and communicates the job status to the JobQueueLUI 76 via the ServerLUI 74 at S222. If at S212, the user determines that the job does not require printing, the user may, at S224, select the ServerLUI 74 and at S226, the ServerLUI receives the user's selections of view operation or system administration operations. At S228, the ServerLUI transmits the selections to the system administration controller 40 of control system 20, which processes them in accordance with its software instructions.

The computer implemented steps S210, S216, S218, S220, S222, S226, S228 of the method illustrated in FIG. 4 may be implemented in a computer program product that may be executed on a computer. The computer program product may be a tangible computer-readable recording medium on which a control program is recorded, such as a disk, hard drive, or may be a transmittable carrier wave in which the control program is embodied as a data signal. Common forms of computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, transmission media, such as acoustic or light waves, such as those generated during radio wave and infrared data communications, and the like, or any other medium from which a computer can read and use.

The exemplary method may be implemented on one or more general purpose computers, special purpose computer(s), a programmed microprocessor or microcontroller and peripheral integrated circuit elements, an ASIC or other integrated circuit, a digital signal processor, a hardwired electronic or logic circuit such as a discrete element circuit, a programmable logic device such as a PLD, PLA, FPGA, or PAL, or the like. In general, any device, capable of implementing a finite state machine that is in turn capable of implementing the flowchart shown in FIG. 4, can be used to implement the method for operating an MFD.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A multifunction image rendering device comprising:
a control system; and
a plurality of local user interfaces comprising:
a first local user interface in communication with the control system for user selection of a selected one of a first group of mutually exclusive operations under the control of the control system, the first user interface including a first display which displays representations of operations selectable with the first user interface, each of the first group of operations comprising scanning;
a second local user interface in communication with the control system for user selection of a selected one of a second group of mutually exclusive operations, different from the first group of operations, which are under the control of the control system, the second user interface includes a second display which displays representations of operations selectable with the second user interface, each of the second group of operations comprising printing but not scanning;
whereby the first and second operations are contemporaneously selectable by respective first and second users; and
optionally, a third local interface in communication with the control system, which serves as an interface between the first and second local user interfaces and the control system.

2. The multifunction device of claim 1, wherein the first and second functions are performable contemporaneously.

3. The multifunction device of claim 1, further comprising:
a first operational component, in communication with the control system and operative to perform a function of the first group of mutually exclusive operations; and
a second operational component, in communication with the control system and operative to perform a function of the second group of mutually exclusive operations.

4. The multifunction device of claim 3, wherein the first operational component includes a scanner which is operative to perform a scanning function.

5. The multifunction device of claim 3, wherein the second operational component includes a printer which is operative to perform a printing function.

6. The multifunction device of claim 5, wherein the second operation is selected from the group consisting of printing documents, printing reports, and combinations thereof.

7. The multifunction device of claim 1, wherein the first operation is selected from the group consisting of scanning, copying, faxing; and combinations thereof.

8. The multifunction device of claim 1, further comprising a housing which carries the first and second local user interfaces and at least one of the first and second operational components.

9. A multifunction device comprising:
a control system;
a plurality of local user interfaces comprising:
   a first local user interface in communication with the control system for user selection of a selected one of a first group of mutually exclusive operations under the control of the control system, the first user interface including a first display which displays representations of operations selectable with the first user interface and a first manually operable user input device by which a first user inputs the first user's selection;
   a second local user interface in communication with the control system for user selection of a selected one of a second group of mutually exclusive operations, different from the first group of operations, which are under the control of the control system, the second user interface including a second display which displays representations of different operations selectable with the second user interface and a second manually operable user input device by which a second user inputs the second user's selection, the second local user interface being spaced sufficiently apart from the first local user interface so that the two users, when physically present at the multifunction device at the same time, can both operate the first and second local user interfaces; and
   optionally, a third local interface in communication with the control system, which serves as an interface between the first and second local user interfaces and the control system;
a first operational component, in communication with the control system and operative to perform a function of the first group of mutually exclusive operations, the first operational component including a scanner which is operative to perform a scanning function; and
a second operational component, in communication with the control system and operative to perform a function of the second group of mutually exclusive operations, the second operational component including a printer which is operative to perform a printing function.

10. The multifunction device of claim 9, wherein the first and second operations are contemporaneously selectable by the respective first and second users.

11. The multifunction device of claim 9, wherein the multifunction device is an image rendering device.

12. The multifunction device of claim 9, wherein each of the first group of operations comprises scanning and each of the second group of operations comprises printing.

13. A method of operating a multifunction device comprising:
displaying representations of a first group of mutually exclusive operations on a first local user interface associated with the multifunction device, each of the first group of operations including scanning;
displaying representations of a second group of mutually exclusive operations on a second local user interface associated with the multifunction device, each of the second group of operations including printing but not scanning;
providing for receiving of a first user's selection of one of the first group of mutually exclusive operations with a first manually operable user input device of the first local user interface;
providing for receiving a second users selection of one of the second group of mutually exclusive operations with a second manually operable user input device of the second local user interface, contemporaneously with the receiving of the first user's selection; and
communicating the first user's selection and second user's selection to a control system of the multifunction device.

14. A multifunction device comprising:
a first operational component which includes a scanner operative to perform a first function which includes scanning;
a second operational component which includes a printer operative to perform a second function, which includes printing;
a first local user interface operative for local selection by a first user of a first operation of the multifunction device which requires the first function, the first local user interface including a first display and a first manually operable user input device for a first user to enter a first user's selection of the first function; and
a second local user interface, separate from the first local user interface, operative for local selection by a second user of a second operation of the multifunction device which requires the second function, the second local user interface including a second display and a second manually operable user input device for a second user to enter a second user's selection of the second function, but not the first function.

15. The multifunction device of claim 14, wherein the first and second operations are contemporaneously selectable by the first and second users.

16. The multifunction device of claim 14, wherein a first group of mutually exclusive operations are selectable on the first local user interface and a second group of mutually exclusive operations are selectable on the second local user interface.

17. The multifunction device of claim 14, wherein the first and second functions are performable contemporaneously.

18. The multifunction device of claim 14, wherein the multifunction device is an image rendering device, the first operational component includes a scanner which is operative to perform a scanning function, and the second operational component includes a printer which is operative to perform a printing function.

19. The multifunction device of claim 18, wherein the first operation is selectable from the group consisting of scanning, copying, faxing, scanning to email, and combinations thereof.

20. The multifunction device of claim 18, wherein the second operation is selectable from the group consisting of printing documents, printing reports, and combinations thereof.

21. The multifunction device of claim 14, wherein the second operation excludes operations requiring the first function.

22. The multifunction device of claim 14, wherein the first local interface groups a plurality of operations which require the first function.

23. The multifunction device of claim 14, wherein the second local interface groups a plurality of operations which require the second function but not the first function.

24. The multifunction device of claim 14, further comprising a controller which controls operation of the first and second operational components and wherein the first and second local user interfaces are communicatively linked to the controller.

25. The multifunction device of claim 14, further comprising a third local user interface operative for local selection, by a third user, of a third operation of the multifunction device.

26. The multifunction device of claim 25, wherein the first, second and third local interfaces are communicatively linked.

27. A user interface network comprising:
a control system; and
a plurality of local user interfaces comprising:
   a first local user interface in communication with the control system including a first display which displays a first group of operations under the control of the control system, the first local user interface including a first manually operable user input device enabling selection by a first user of a first operation selected from the first group of operations, each of the operations in the first group operations including marking;
   a second local user interface in communication with the control system including a second display which displays a second group of operations under the control of the control system, the second local user interface including a second manually operable user input device enabling selection by a second user of a second operation selected from the second group of operations, each of the operations in the second group of operations including scanning; and
   optionally a third local interface in communication with the control system, which displays a third group of operations under the control of the control system, each of the operations in the third group of operations being capable of contemporaneous performance with the first and second operations.

28. The user interface network of claim 27, wherein the first, second and optional third local interfaces are communicatively linked with the control system though one of the plurality of local user interfaces.

29. The user interface network of claim 27, wherein the second user interface does not enable selection of an operation selected from the first group of operations.

30. The user interface network of claim 27, wherein the first user interface does not enable selection of an operation selected from the second group of operations.

* * * * *